(12) United States Patent
Yamamoto et al.

(10) Patent No.: US 11,927,599 B2
(45) Date of Patent: Mar. 12, 2024

(54) DETECTION APPARATUS AND DAMPER STRUCTURE

(71) Applicants: JVCKENWOOD Corporation, Yokohama (JP); SYSMEX CORPORATION, Kobe (JP)

(72) Inventors: Masahiro Yamamoto, Yokohama (JP); Shigeru Yokota, Yokohama (JP); Hideki Samata, Yokohama (JP); Tomoyuki Nose, Kobe (JP); Sayuri Tomoda, Kobe (JP)

(73) Assignees: JVCKENWOOD Corporation, Yokohama (JP); SYSMEX CORPORATION, Kobe (JP)

( * ) Notice: Subject to any disclaimer, the term of this patent is extended or adjusted under 35 U.S.C. 154(b) by 570 days.

(21) Appl. No.: 17/156,728

(22) Filed: Jan. 25, 2021

(65) Prior Publication Data

US 2021/0231696 A1 Jul. 29, 2021

(30) Foreign Application Priority Data

Jan. 29, 2020 (JP) ................... 2020-012808

(51) Int. Cl.
*G01N 35/02* (2006.01)
*G01N 35/04* (2006.01)
*G01N 35/10* (2006.01)

(52) U.S. Cl.
CPC ....... *G01N 35/021* (2013.01); *G01N 35/1081* (2013.01); *G01N 2035/0439* (2013.01)

(58) Field of Classification Search
CPC ............. G01N 35/021; G01N 35/1081; G01N 2035/0439; G01N 35/00069; G01N 2035/00306; G01N 2035/00465; E05Y 2201/25; E05Y 2900/602; E05F 3/14
USPC ...................................... 73/863.91
See application file for complete search history.

(56) References Cited

U.S. PATENT DOCUMENTS

| 9,586,731 | B2 * | 3/2017 | Sawada ................. B65D 43/14 |
| 2010/0095485 | A1 * | 4/2010 | Ohashi ..................... E05F 3/14 16/319 |
| 2017/0030859 | A1 | 2/2017 | Huber |
| 2017/0058324 | A1 | 3/2017 | Balog et al. |
| 2018/0003704 | A1 * | 1/2018 | Horii ................. B01L 3/502761 |

FOREIGN PATENT DOCUMENTS

| AU | 2017204223 | 1/2018 | |
| EP | 2734416 B1 * | 2/2018 | ............. E05D 11/06 |
| JP | 07-238966 | 9/1995 | |
| JP | 2005-067708 | 3/2005 | |

(Continued)

*Primary Examiner* — Marrit Eyassu
(74) *Attorney, Agent, or Firm* — Amin, Turocy & Watson, LLP (57) ABSTRACT

Included are: a main body including an installation part in which a cartridge housing a liquid for treating a test substance contained in a specimen is installed and a detector configured to detect the test substance treated with the liquid within the cartridge installed in the installation part; a lid part arranged rotatably on the main body about a shaft so as to open and close the installation part; a biasing part biasing the lid part in an opening direction; and a plurality of regulators each generating resistance against a biasing force in the opening direction at different timing during an opening motion of the lid part.

15 Claims, 10 Drawing Sheets

(56) References Cited

FOREIGN PATENT DOCUMENTS

| | | | | |
|---|---|---|---|---|
| JP | 2007145300 A | * | 6/2007 | ............... B60R 7/06 |
| JP | 2009-109410 | | 5/2009 | |
| JP | 2013-133018 | | 7/2013 | |
| JP | 2017062016 A | * | 3/2017 | |
| JP | 2017-519485 | | 7/2017 | |
| JP | 2019-045513 | | 3/2019 | |

* cited by examiner

|  | FIRST DAMPER | SECOND DAMPER | TOTAL |
|---|---|---|---|
| FIRST SECTION 0° TO 20° | IDLING | IDLING | ABSENT |
| SECOND SECTION 20° TO 40° | IDLING | CONTACT (GENERATION OF DAMPER RESISTANCE) | WEAK |
| THIRD SECTION 40° TO 60° | CONTACT (GENERATION OF DAMPER RESISTANCE) | CONTACT (GENERATION OF DAMPER RESISTANCE) | STRONG |

FIG.12

PRIOR ART

DETECTION APPARATUS AND DAMPER STRUCTURE

CROSS-REFERENCE TO RELATED APPLICATIONS

This application claims priority from Japanese Application No. 2020-012808, filed on Jan. 29, 2020, the contents of which are incorporated by reference herein in its entirety.

BACKGROUND

1. Technical Field

The present disclosure relates to a detection apparatus and a damper structure.

2. Description of the Related Art

A detection apparatus that mixes a specimen and liquid as a reagent with each other to detect a test substance contained in the specimen is known. A container such as a chip or a cartridge housing the specimen is inserted from an opening provided in the detection apparatus, the opening is covered with a lid part, and then the test substance contained in the specimen is detected.

In Japanese Patent Application Laid-open No. 2017-519485, for example, a portable analysis apparatus analyzing a sample containing a protein analyte such as blood is known.

Figure 12:
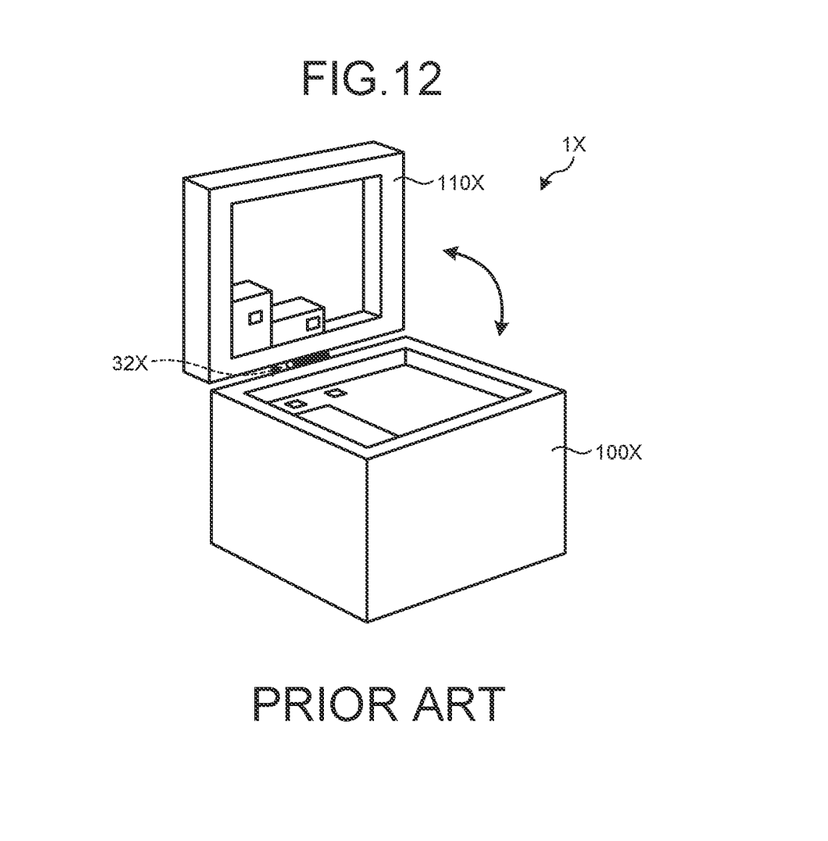
FIG. 12 is a schematic configuration diagram of an exemplary conventional analysis apparatus.

FIG. 12 is a schematic configuration diagram of an exemplary conventional analysis apparatus 1X. The analysis apparatus 1X has a main body 100X and a lid part 110X arranged in an openable and closable manner with respect to the main body 100X. The lid part 110X of the analysis apparatus 1X is provided with a spring 32X or the like biasing the lid part 110X in an opening direction, and the lid part 110X opens through its biasing force. However, when the lid part 110X of the analysis apparatus 1X opens, the analysis apparatus 1X may topple through momentum during the process, which may provide insufficient safety.

SUMMARY

It is an object of the present disclosure to at least partially solve the problems in the conventional technology.

To solve the above problem and achieve the object, a detection apparatus according to the present disclosure includes a main body comprising an installation part in which a cartridge housing a liquid for treating a test substance contained in a specimen is installed and a detector configured to detect the test substance treated with the liquid within the cartridge installed in the installation part, a lid part arranged rotatably on the main body about a shaft so as to open and close the installation part, a biasing part biasing the lid part in an opening direction, and a plurality of regulators each generating resistance against a biasing force in the opening direction at different timing during an opening motion of the lid part.

A damper structure according to the present disclosure includes a biasing part biasing, in an opening direction, a lid part arranged rotatably on a main body about a shaft in an openable and closable manner; and a plurality of regulators each generating resistance against a biasing force in the opening direction at different timing during an opening motion of the lid part.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

The following describes an embodiment of a detection apparatus 1 according to the present disclosure in detail with reference to the accompanying drawings. The following embodiment does not limit the present disclosure.

In the following description, a front-and-rear direction defines a direction toward the front as "front" of the front-and-rear direction and a direction toward the rear as "rear" of the front-and-rear direction. The front-and-rear direction is defined as an X-axial direction. A right-and-left direction is a direction horizontally orthogonal to the front-and-rear direction. When viewed from the front, the left-hand side is "left," whereas the right-hand side is "right." The right-and-left direction is defined as a Y-axial direction. An up-and-down direction is a direction orthogonal to the front-and-rear direction and the right-and-left direction. The up-and-down direction is defined as a Z-axial direction. Consequently, the front-and-rear direction, the right-and-left direction, and the vertical direction are three-dimensionally orthogonal to each other.

EMBODIMENT

Detection Apparatus

Figure 1:
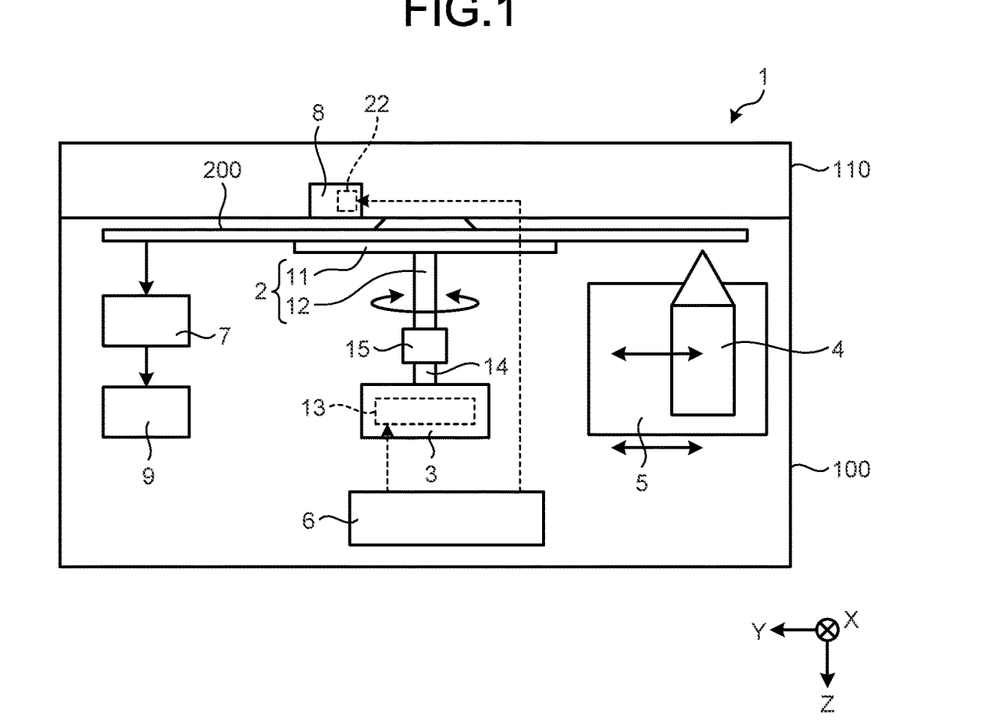
FIG. 1 is a schematic configuration diagram of a detection apparatus according to an embodiment.
Figure 2:
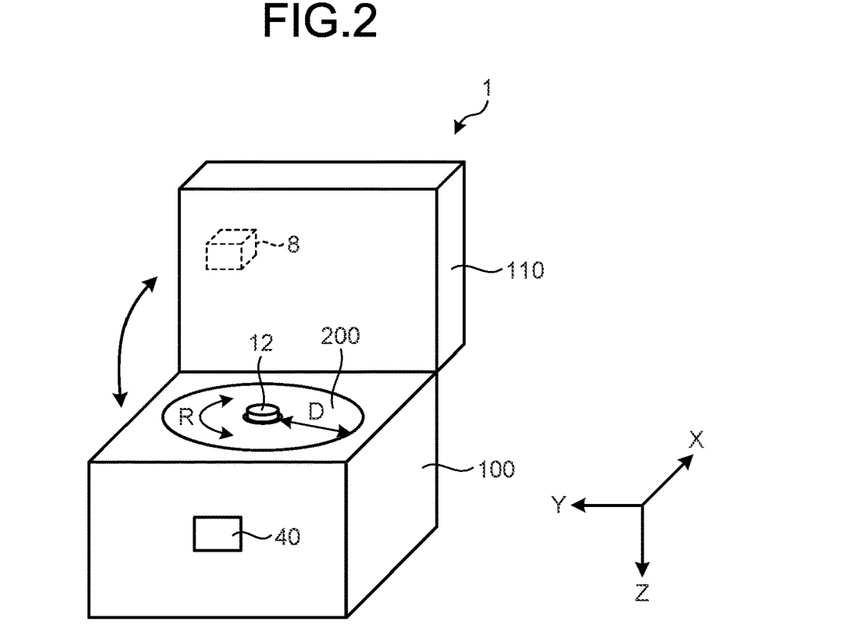
FIG. 2 is a schematic perspective view of the detection apparatus according to the embodiment.

FIG. 1 is a schematic configuration diagram of the detection apparatus 1 according to the embodiment. FIG. 2 is a schematic perspective view of the detection apparatus 1 according to the embodiment. The detection apparatus 1 is an apparatus that successively transfers magnetic particles contained in a specimen to a plurality of chambers to cause the magnetic particles to carry a test substance and a labeled substance and to detect the test substance based on the labeled substance. The detection apparatus 1 detects the test substance in the specimen using an antigen-antibody reaction. As illustrated in FIG. 1, the detection apparatus 1 includes a holding mechanism (an installation part) 2, a drive mechanism 3, a magnet 4, a moving mechanism 5, a controller 6, a detector 7, a pressing part 8, and an analyzer 9.

A cartridge 200 housing liquid for treating the test substance contained in the specimen is installed on the holding mechanism 2. The holding mechanism 2 has a rotating table 11 and a rotating shaft 12. The cartridge 200 is installed on the rotating table 11. The rotating shaft 12 extends in the Z-axial direction. An upper end of the rotating shaft 12 is fixed to the rotating table 11. The configuration of the holding mechanism 2 is not limited to this example; another mechanism such as a sliding mechanism may be used, for example.

The drive mechanism 3 rotates the rotating table 11. The drive mechanism 3 has a motor 13, a drive shaft 14, and a coupling 15. The drive shaft 14 extends in the Z-axial direction. The drive shaft 14 is connected to a lower end of the rotating shaft 12 of the holding mechanism 2 via the coupling 15. The drive mechanism 3 drives the motor 13 to rotate the cartridge 200 mounted on the rotating table 11 about the rotating shaft 12.

The magnet 4 successively transfers the magnetic particles contained in the specimen to the chambers.

The moving mechanism 5 moves the magnet 4.

The controller 6 is an arithmetic processor including a central processing unit (CPU) or a micro processing unit (MPU), for example. The controller 6 has a storage unit including a flash memory or a hard disk, for example. The controller 6 receives signals from the parts of the detection apparatus 1 and controls the parts of the detection apparatus 1. The controller 6 controls the holding mechanism 2 and the moving mechanism 5. The controller 6 drives the moving mechanism 5 to move the magnet 4.

The detector 7 detects the test substance treated with the liquid within the cartridge 200 installed on the rotating table 11 of the holding mechanism 2.

The pressing part 8 presses a sealant sealing the liquid housed in the cartridge 200 to open the sealant.

The analyzer 9 analyzes the test substance contained in the specimen injected into the cartridge 200 based on light detected by the detector 7. The detector 7 is described as one including a photomultiplier, which is not limiting, and may include a photoelectric tube or a photodiode, for example. The analyzer 9 is an arithmetic processor including a CPU or an MPU, for example. The analyzer 9 has a storage unit including a flash memory or a hard disk, for example. The analyzer 9 may be placed as a computer connected to the detection apparatus 1 or placed as a computer on a network such as a cloud, for example.

Figure 3:
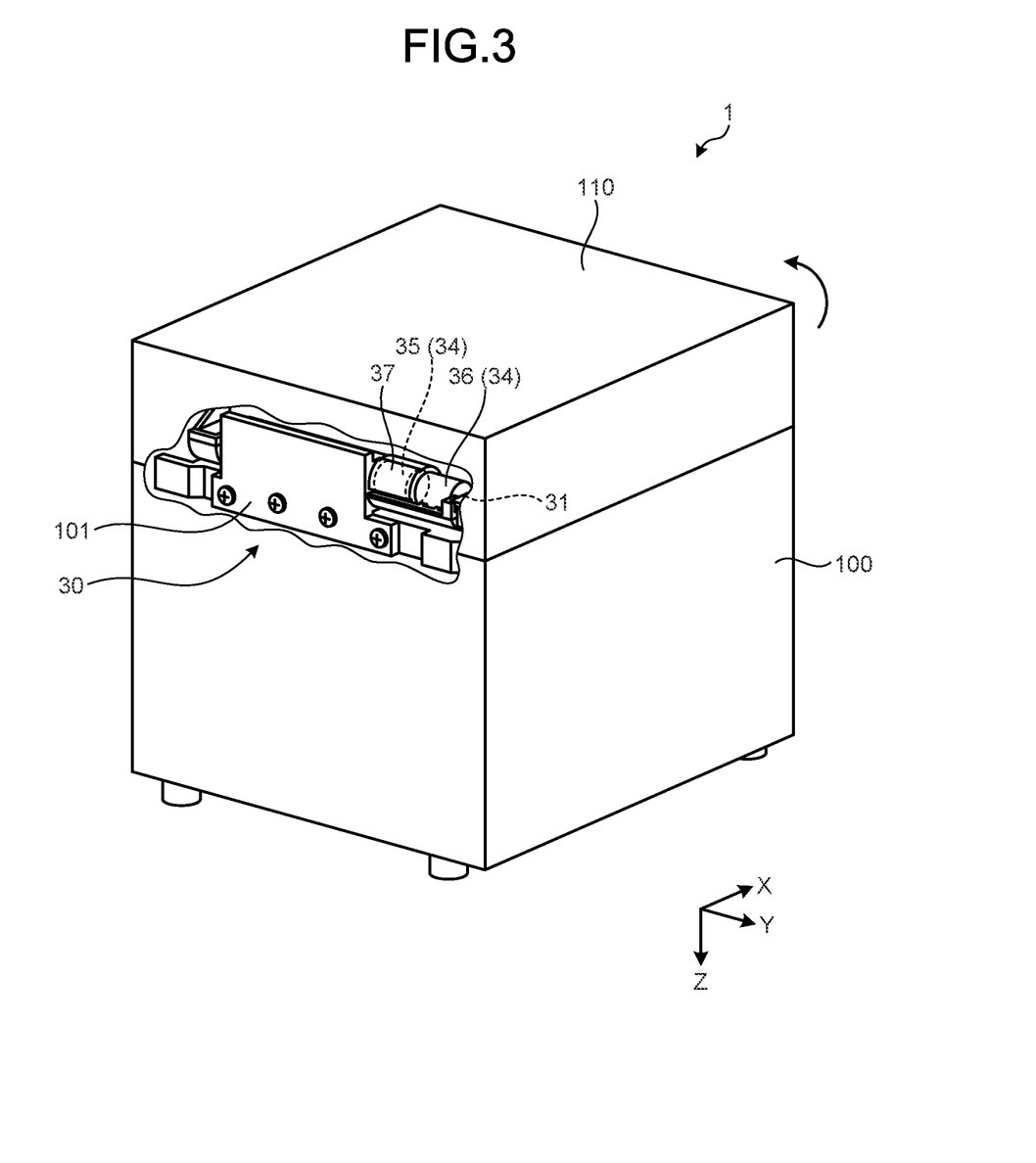
FIG. 3 is a schematic perspective view of the detection apparatus according to the embodiment illustrating a state in which a lid part is closed.
Figure 4:
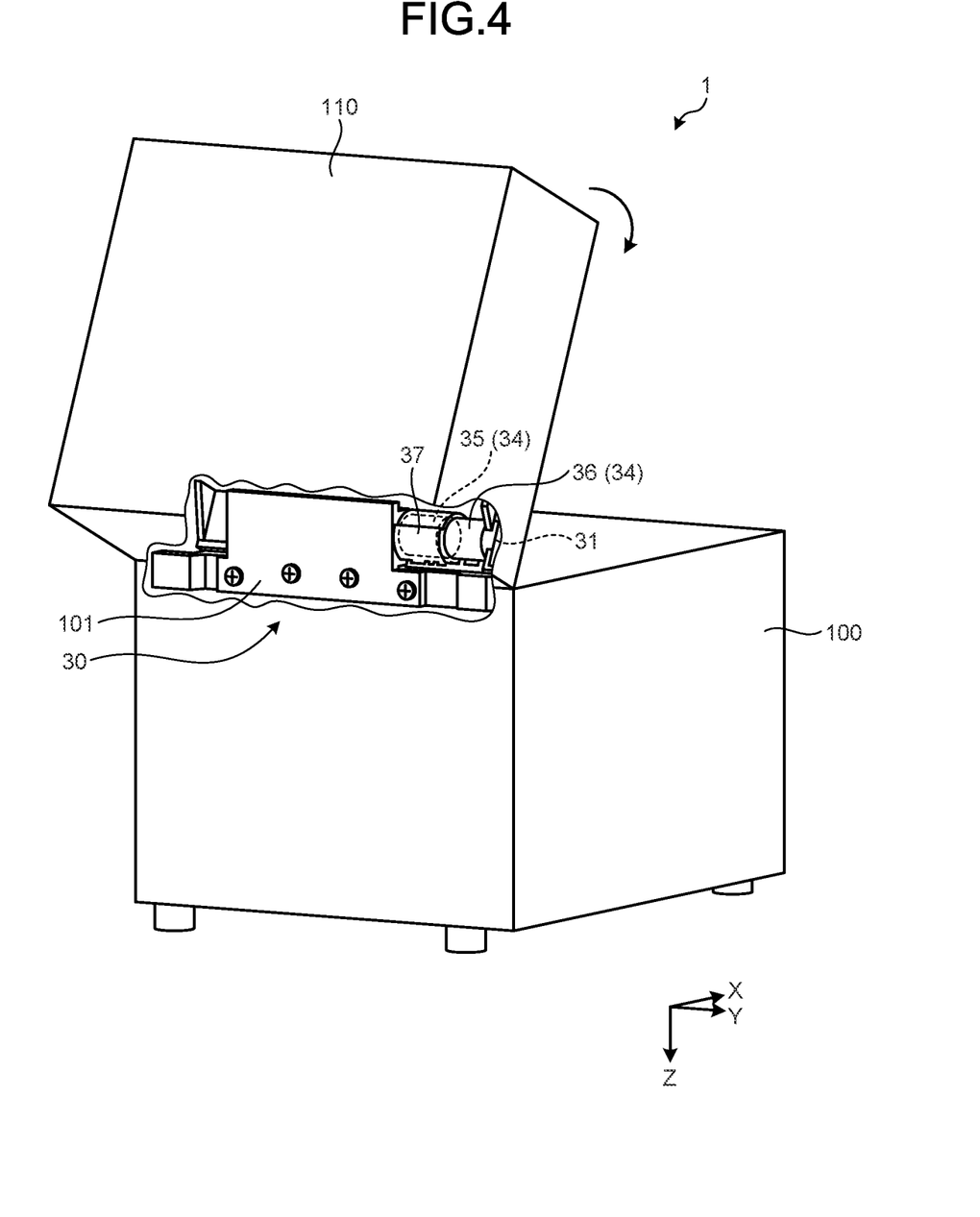
FIG. 4 is a schematic perspective view of the detection apparatus according to the embodiment illustrating a state in which the lid part is open.

FIG. 3 is a schematic perspective view of the detection apparatus 1 according to the embodiment illustrating a state in which a lid part 110 is closed. FIG. 4 is a schematic perspective view of the detection apparatus 1 according to the embodiment illustrating a state in which the lid part 110 is open. The detection apparatus 1 has a main body 100 and the lid part 110. The main body 100 supports the lid part 110 in an openable and closable manner. When the cartridge 200 is attached or detached, the lid part 110 is opened as illustrated in FIG. 2. Placed in the main body 100 are the holding mechanism 2, the drive mechanism 3, the magnet 4, the moving mechanism 5, the controller 6, the detector 7, and the analyzer 9. The cartridge 200 is installed on the holding mechanism 2 placed in an upper part of the main body 100. A display unit 40 is placed on a front part of the main body 100. The pressing part 8 is placed in the lid part 110.

Figure 5:
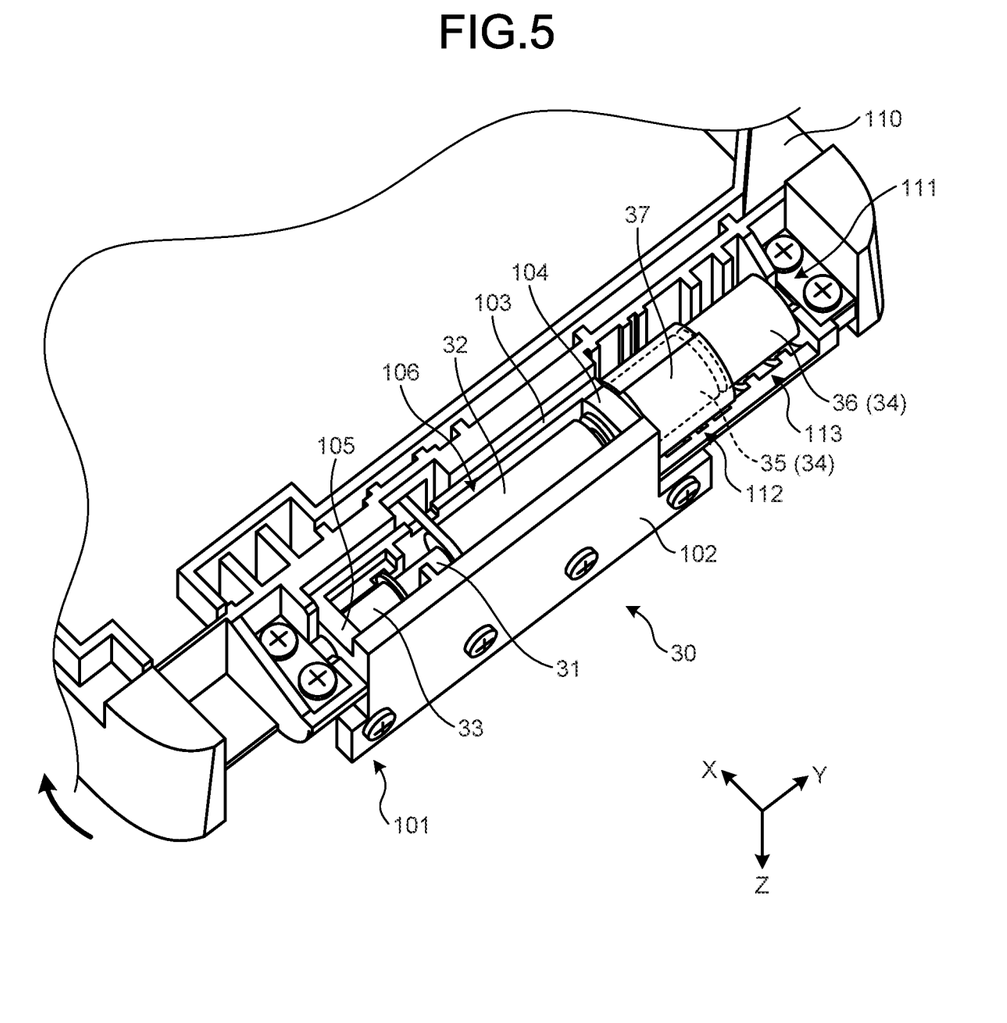
FIG. 5 is a perspective view illustrating a base part and a damper structure according to the embodiment.
Figure 6:
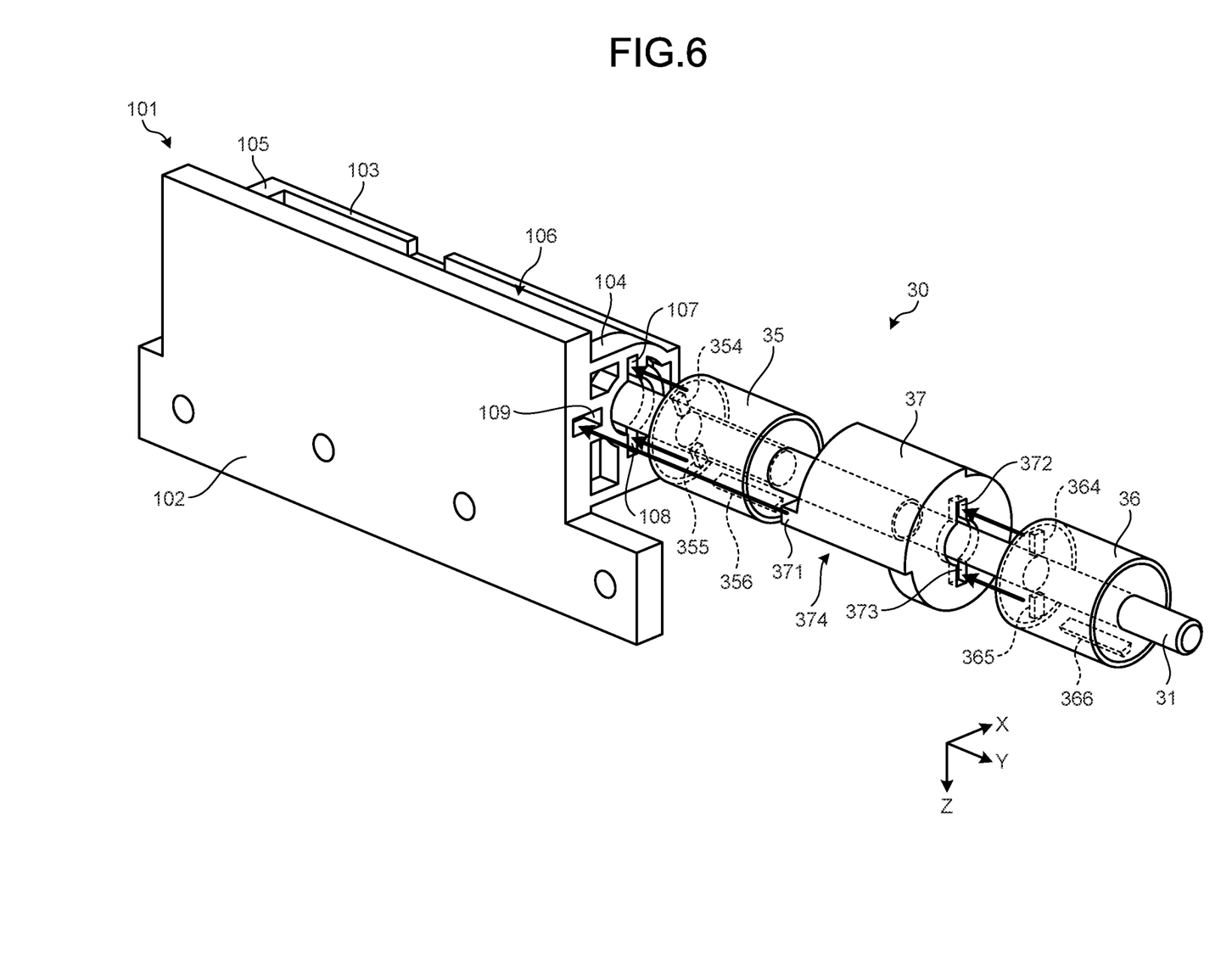
FIG. 6 is an exploded perspective view of the damper structure according to the embodiment.

FIG. 5 is a perspective view illustrating a base part 101 and a damper structure 30 according to the embodiment. FIG. 6 is an exploded perspective view of the damper structure 30 according to the embodiment. As illustrated in FIG. 4, a base part 101 on which the damper structure 30 is mounted is placed on a rear part of the main body 100 opposite to the front. The base part 101 is fixed to the main body 100. As illustrated in FIG. 5, the base part 101 includes a wall part 102, a wall part 103 placed facing the wall part 102, a wall part 104 connecting the wall part 102 and the wall part 103 with each other, and a wall part 105 connecting the wall part 102 and the wall part 103 with each other and placed facing the wall part 104. As illustrated in FIG. 6, the space surrounded by the wall part 102, the wall part 103, the wall part 104, and the wall part 105 is a housing part 106. The housing part 106 houses a shaft 31 and a biasing part 32. An upper part of the housing part 106 opens.

As illustrated in FIG. 6, the wall part 104 is formed with a hole part 107, a hole part 108, and a hole part 109. A first protruding part 354 of a first damper (a first regulator) 35 of the damper structure 30 is engaged with the hole part 107. A first protruding part 355 of the first damper 35 is engaged with the hole part 108. A protruding part 371 of a coupling part 37 of the damper structure 30 is engaged with the hole part 109.

As illustrated in FIG. 3 and FIG. 4, the lid part 110 is arranged rotatably on the main body 100 about the shaft 31 of the damper structure 30. The lid part 110 rotates about the shaft 31 of the damper structure 30 and is arranged so as to enable the holding mechanism 2 (refer to FIG. 1) to open and close. When the lid part 110 is opened with respect to the main body 100, the holding mechanism 2 is exposed. A support part 111 facing part of the damper structure 30 is placed on a rear part of the lid part 110 opposite to the front.

Figure 7:
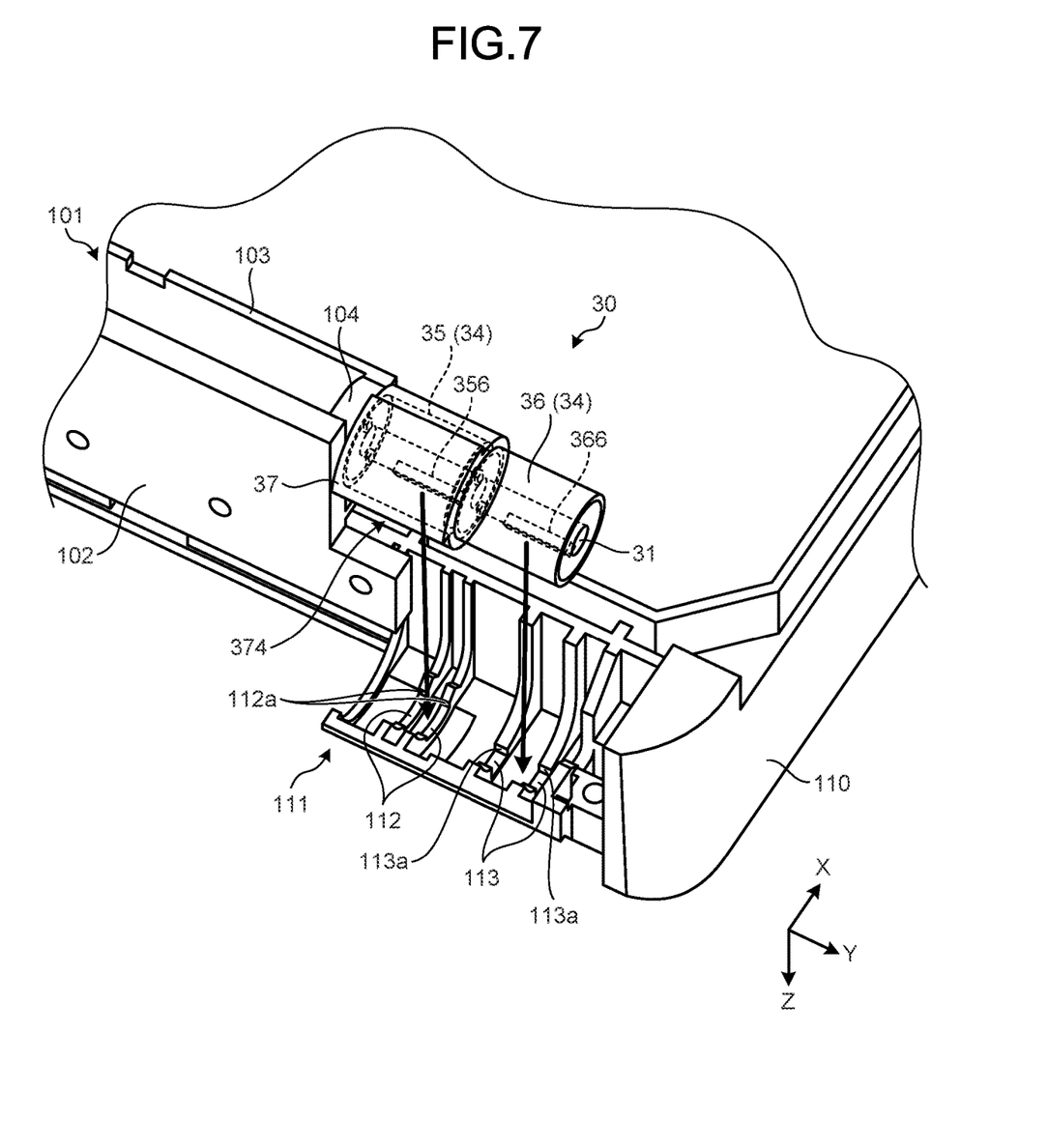
FIG. 7 is an exploded perspective view of the damper structure according to the embodiment illustrating the damper structure and the lid part.

FIG. 7 is an exploded perspective view of the damper structure 30 according to the embodiment illustrating the damper structure 30 and the lid part 110. The support part 111 is placed side by side with the housing part 106 (refer to FIG. 6) in the Y-axial direction. The support part 111 is placed facing a regulator 34 of the damper structure 30. The support part 111 is placed rotatably about the shaft 31 of the damper structure 30. The support part 111 has a function of regulating a time at which the regulator 34 of the damper structure 30 generates resistance during an opening operation of the lid part 110. The support part 111 includes a first recessed part 112 in which a second protruding part 356 of the first damper 35 is placed and a second recessed part 113 in which a second protruding part 366 of a second damper (a second regulator) 36 is placed.

The first recessed part 112 is placed at a position closer to the wall part 104 than the second recessed part 113 is. The first recessed part 112 is an arc-shaped recessed part formed in the support part 111. The first recessed part 112 defines a movable range of the second protruding part 356 of the first damper 35.

The second recessed part 113 is placed at a position farther from the wall part 104 than the first recessed part 112 is. The second recessed part 113 is an arc-shaped recessed part formed in the support part 111. The second recessed part 113 defines a movable range of the second protruding part 366 of the second damper 36.

Figure 9:
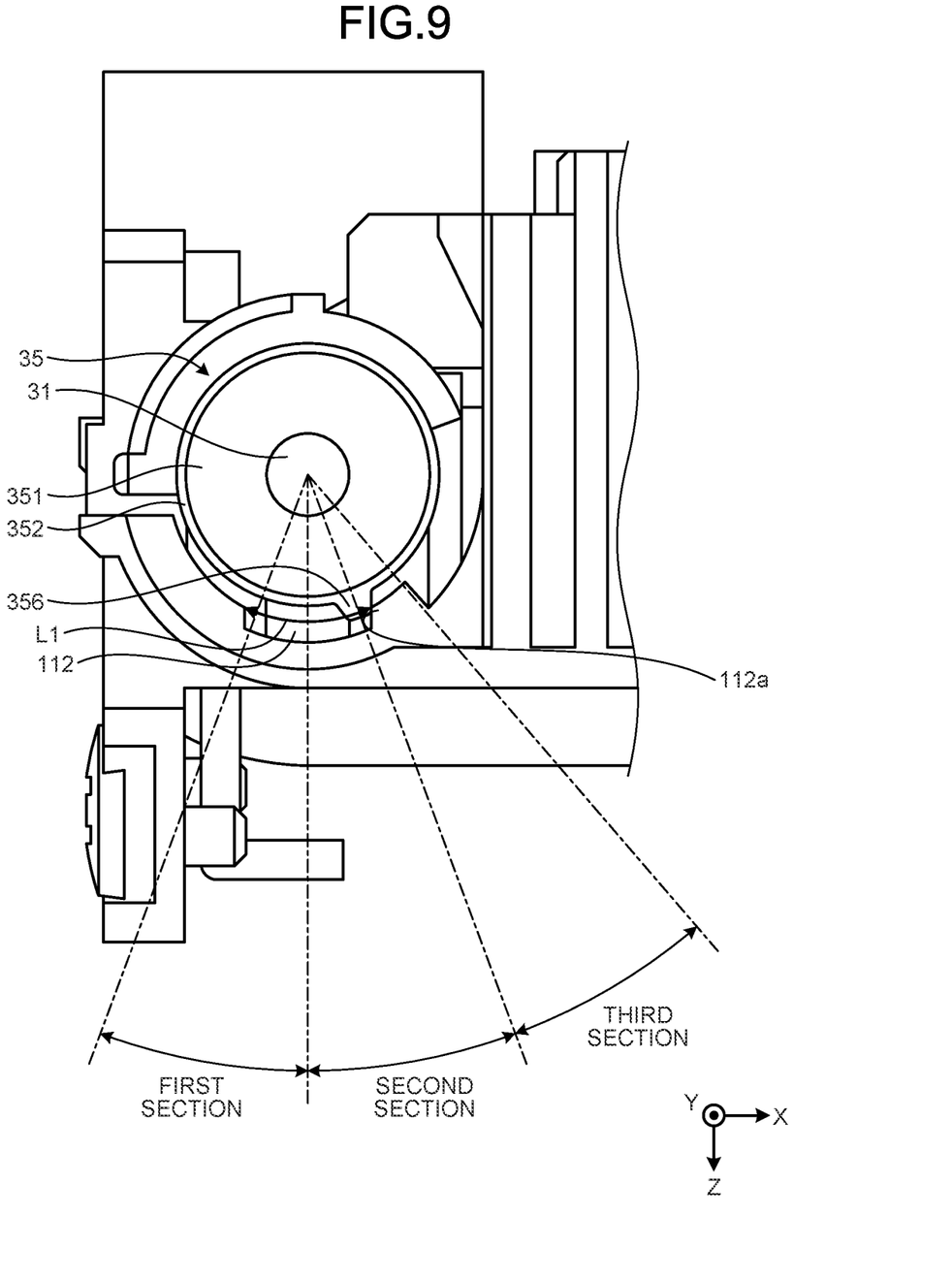
FIG. 9 is a schematic view illustrating a movable range of the first damper according to the embodiment.
Figure 10:
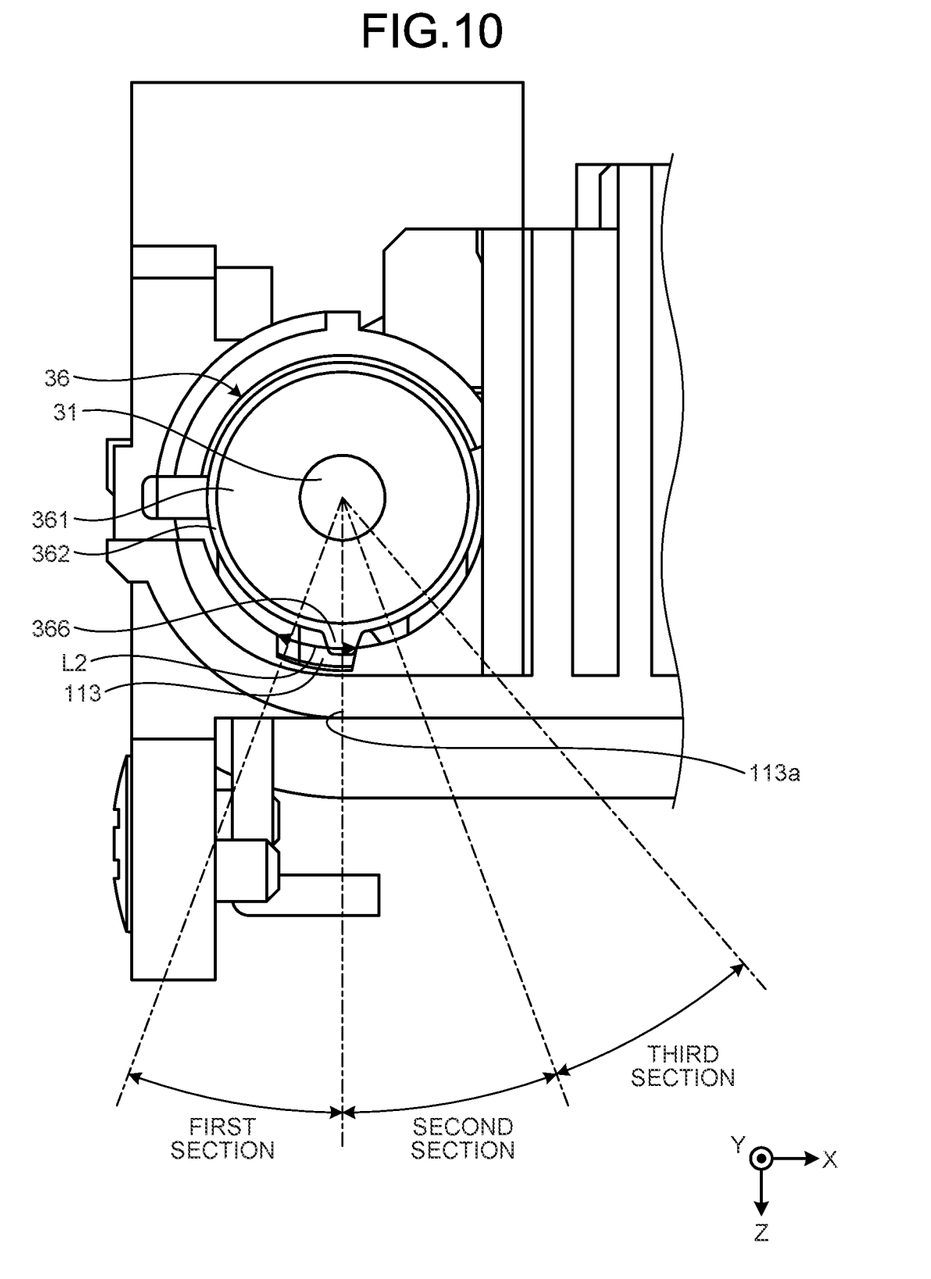
FIG. 10 is a schematic view illustrating a movable range of a second damper according to the embodiment.

A circumferential length L1 on a radial inside of the first recessed part 112 (refer to FIG. 9) is longer than a circumferential length L2 on a radial inside of the second recessed part 113 (refer to FIG. 10). In other words, the movable range of the second protruding part 356 of the first damper 35 in the first recessed part 112 is wider than the movable range of the second protruding part 366 of the second damper 36 in the second recessed part 113.

Damper Structure

Figure 8:
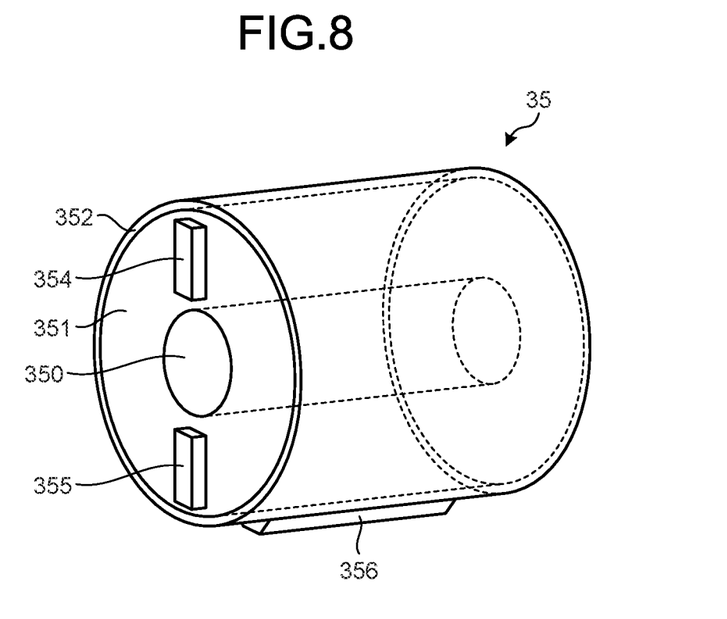
FIG. 8 is a perspective view illustrating a first damper according to the embodiment.

FIG. 8 is a perspective view illustrating the first damper 35 according to the embodiment. FIG. 9 is a schematic view illustrating a movable range of the first damper 35 according to the embodiment. FIG. 10 is a schematic view illustrating a movable range of the second damper 36 according to the embodiment. The detection apparatus 1 illustrated in FIG. 1 to FIG. 4 has the damper structure 30 regulating an opening speed of the lid part 110. In the present embodiment, the damper structure 30 reduces the opening speed of the lid part 110. The damper structure 30 has the shaft 31 extending in the Y-axial direction, the biasing part 32, a main body biasing part 33, a plurality of regulators 34, and the coupling part 37.

The biasing part 32 illustrated in FIG. 5 is placed on the shaft 31 to bias the lid part 110 in an opening direction. The biasing part 32 is placed in the housing part 106 of the base part 101. The biasing part 32 is a torsion spring, for example. Owing to the biasing part 32, the lid part 110 is smoothly opened.

The main body biasing part 33 illustrated in FIG. 5 is placed on the shaft 31 to bias the main body 100 (refer to FIG. 2 to FIG. 4) in a shaft direction. The main body biasing part 33 is placed on another side of the biasing part 32 in the shaft direction. The main body biasing part 33 is placed in the housing part 106 of the base part 101 (refer to FIG. 3 and FIG. 4). In the present embodiment, the main body biasing part 33 biases the main body 100 in a −Y direction via the base part 101. The main body biasing part 33 is a compression spring, for example. The main body biasing part 33 positions the shaft 31 with respect to the base part 101 to reduce wobbling.

The regulators 34 illustrated in FIG. 5 to FIG. 7 are placed on the shaft 31. The regulators 34 are placed between the base part 101 of the main body 100 and the shaft 31. The regulators 34 are placed on one side of the biasing part 32 in the shaft direction. The regulators 34 regulate a time at which resistance against a biasing force in the opening direction by the biasing part 32 starts to be generated during the opening operation of the lid part 110. In the present embodiment, the regulators 34 are placed so as to be different from each other in the time at which resistance against the biasing force in the opening direction by the biasing part 32 starts to be generated during the opening operation of the lid part 110. The regulators 34 reduce the opening speed of the lid part 110 at the time at which resistance starts to be generated. The regulators 34 are placed so as to simultaneously generate resistance in a partial period during the opening operation of the lid part 110. The regulators 34 include rotary dampers. In the present embodiment, the regulators 34 include the first damper 35 and the second damper 36 coupled in the shaft direction of the first damper 35.

The first damper 35 illustrated in FIG. 8 is placed between the base part 101 (refer to FIG. 3 and FIG. 4) of the main body 100 (refer to FIG. 2 to FIG. 4) and the shaft 31 (refer to FIG. 3 and FIG. 4). The first damper 35 starts to generate resistance later than the second damper 36 (refer to FIG. 5) during the opening operation of the lid part 110 (refer to FIG. 2 to FIG. 4). The first damper 35 is placed closer to the biasing part 32 (refer to FIG. 5) than the second damper 36 is in the shaft direction. The first damper 35 has a hole part 350 through which the shaft 31 is inserted, a base part 351 fixed to the main body 100, and a rotating part 352 rotating about the shaft 31 with respect to the base part 351. The base part 351 and the rotating part 352 are placed with the shaft 31 as their center. The rotating part 352 is placed covering a peripheral face of the base part 351. The first damper 35 has the first protruding part 354 and the first protruding part 355 protruding in the shaft direction from an end face on one side of the base part 351 in the shaft direction. The first damper 35 has the second protruding part 356 protruding radially outward from a peripheral face of the rotating part 352.

As illustrated in FIG. 6, the first protruding part 354 is engaged with the hole part 107 of the wall part 104 of the base part 101, whereas the first protruding part 355 is engaged with the hole part 108 of the wall part 104. Thus, the base part 351 is fixed to the main body 100 (refer to FIG. 2 to FIG. 4) via the base part 101. The base part 351 does not rotate about the shaft 31 during the opening operation of the lid part 110 (refer to FIG. 2 to FIG. 4).

As illustrated in FIG. 9, the second protruding part 356 is positioned at the first recessed part 112 of the support part 111 (refer to FIG. 7). Through an opening and closing operation of the lid part 110 (refer to FIG. 2 to FIG. 4), the relative positional relation of the second protruding part 356 to the first recessed part 112 changes. In a state in which the second protruding part 356 is positioned at an intermediate part of the first recessed part 112 (hereinafter, referred to as an "intermediate state of the second protruding part 356"), the lid part 110 rotates along a circumferential direction of the first damper 35. In the intermediate state of the second protruding part 356, the first damper 35 does not operate, and the lid part 110 does not receive resistance of the first damper 35. In the intermediate state of the second protruding part 356, the first damper 35 idles. The first damper 35, during the opening operation of the lid part 110, does not reduce the opening speed of the lid part 110 in the intermediate state of the second protruding part 356.

In a state in which the second protruding part 356 is in contact with a circumferential end part 112a of the first recessed part 112 (hereinafter, referred to as a "contact state of the second protruding part 356"), the second protruding part 356 is caught by the end part 112a, thus generating resistance against the rotation of the lid part 110 along the circumferential direction of the first damper 35. In the contact state of the second protruding part 356, the rotating part 352 rotates about the shaft 31 with respect to the base part 351 in step with the rotation of the lid part 110 in the opening direction. The first damper 35, during the opening operation of the lid part 110, reduces the opening speed of the lid part 110 in the contact state of the second protruding part 356.

As illustrated in FIG. 10, the second damper 36 is placed between the base part 101 (refer to FIG. 3 and FIG. 4) of the main body 100 (refer to FIG. 2 to FIG. 4) and the shaft 31. The second damper 36 starts to generate resistance prior to the first damper 35 during the opening operation of the lid part 110 (refer to FIG. 2 to FIG. 4). The second damper 36 is configured like the first damper 35 illustrated in FIG. 8. The second damper 36 is placed farther from the biasing part 32 than the first damper 35 is in the shaft direction. The second damper 36 has a hole part through which the shaft 31 is inserted, a base part 361 fixed to the coupling part 37, and a rotating part 362 rotating about the shaft 31 with respect to the base part 361. The base part 361 and the rotating part 362 are placed with the shaft 31 as their center. The rotating part 362 is placed covering a peripheral face of the base part 361. The second damper 36 has a first protruding part 364 and a first protruding part 365 protruding in the shaft direction from an end face on one side of the base part 361 in the shaft direction. The second damper 36 has the second protruding part 366 protruding radially outward from a peripheral face of the rotating part 362.

As illustrated in FIG. 6, the first protruding part 364 is engaged with a hole part 372 of the coupling part 37, whereas the first protruding part 365 is engaged with a hole part 373 of the coupling part 37. Thus, the base part 361 is fixed to the main body 100 (refer to FIG. 2 to FIG. 4) via the coupling part 37 and the base part 101. The base part 361 does not rotate about the shaft 31 during the opening operation of the lid part 110 (refer to FIG. 2 to FIG. 4).

As illustrated in FIG. 10, the second protruding part 366 is positioned at the second recessed part 113 of the support part 111 (refer to FIG. 7). Through the opening and closing operation of the lid part 110 (refer to FIG. 2 to FIG. 4), the relative positional relation of the second protruding part 366 to the second recessed part 113 changes. In a state in which the second protruding part 366 is positioned at an intermediate part of the second recessed part 113 (hereinafter, referred to as an "intermediate state of the second protruding part 366"), the lid part 110 rotates along a circumferential direction of the second damper 36. In the intermediate state of the second protruding part 366, the second damper 36 does not operate, and the lid part 110 does not receive resistance of the second damper 36. In the intermediate state of the second protruding part 366, the second damper 36 idles. The second damper 36, during the opening operation of the lid part 110, does not reduce the opening speed of the lid part 110 in the intermediate state of the second protruding part 366.

In a state in which the second protruding part 366 is in contact with a circumferential end part 113a of the second recessed part 113 (hereinafter, referred to as a "contact state of the second protruding part 366"), the second protruding part 366 is caught by the circumferential end part 113a, thus generating resistance against the rotation of the lid part 110 along the circumferential direction of the second damper 36. In the contact state of the second protruding part 366, the rotating part 362 rotates about the shaft 31 with respect to the base part 361 in step with the rotation of the lid part 110 in the opening direction. The second damper 36, during the opening operation of the lid part 110, reduces the opening speed of the lid part 110 in the contact state of the second protruding part 366.

As illustrated in FIG. 6, the coupling part 37 couples the first damper 35 and the second damper 36 with each other in the shaft direction. The coupling part 37 is placed covering a peripheral face of the first damper 35. The coupling part 37 is fixed to the main body 100 (refer to FIG. 2 to FIG. 4) via the base part 101. The coupling part 37 has a protruding part 371 protruding in the shaft direction from an end part on one side in the shaft direction. The coupling part 37 has a hole part 372 and a hole part 373 on an end face on another side in the shaft direction. The coupling part 37 has a notched part 374 partially notched on its peripheral face. Part of the peripheral face of the first damper 35 housed within the coupling part 37 is exposed out of the notched part 374. The circumferential length of the notched part 374 is defined by an operating range (a movable range) of the first damper 35 housed therewithin during an opening and closing operation of the lid part 110 (refer to FIG. 2 to FIG. 4). The notched part 374 is formed corresponding to a section in which the rotating part 352 (refer to FIG. 9) of the first damper 35 rotates about the shaft 31 during the opening and closing operation of the lid part 110.

Opening and Closing Operation and Action of Detection Apparatus

Figure 11:
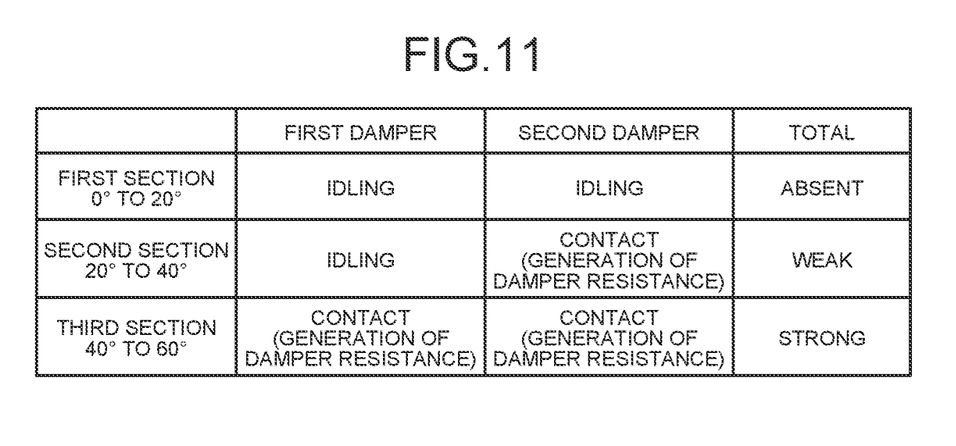
FIG. 11 is a diagram illustrating a movable range of regulators according to the embodiment.

The following describes an opening and closing operation and action of the thus configured lid part 110 of the detection apparatus 1. FIG. 11 is a diagram illustrating a movable range of the regulators 34 according to the embodiment. The following description will be given on the assumption that the lid part 110 opens up to 60° with respect to the main body 100 with a state in which the lid part 110 is closed as 0°.

The section in which the opening of the lid part 110 is from 0° to 20° is referred to as a first section. The second protruding part 356 of the first damper 35 is positioned at the intermediate part of the first recessed part 112 of the support part 111. In the first section, the first damper 35 does not operate, and the lid part 110 does not receive resistance of the first damper 35. The second protruding part 366 of the second damper 36 is positioned at the intermediate part of the second recessed part 113 of the support part 111. In the first section, the second damper 36 does not operate, and the lid part 110 does not receive resistance of the second damper 36. Thus, in the first section, the lid part 110 rotates along the circumferential direction of the regulators 34 without receiving resistance. In the first section, the first damper 35 and the second damper 36 idle. In the first section, the opening speed of the lid part 110 is not reduced.

The section in which the opening of the lid part 110 is from 20° to 40° is referred to as a second section. Like in the first section, the second protruding part 356 of the first damper 35 is positioned at the intermediate part of the first recessed part 112 of the support part 111. The second protruding part 366 of the second damper 36 is in contact with the circumferential end part 113a of the second recessed part 113 of the support part 111. The second protruding part 366 is in contact with the circumferential end part 113a, and thus the rotating part 362 of the second damper 36 rotates about the shaft 31 with respect to the base part 361 in step with the rotation of the lid part 110 in the opening direction. In the second section, the first damper 35 idles, whereas the second damper 36 operates to generate resistance. The lid part 110, receiving resistance of the second damper 36, rotates along the circumferential direction of the regulators 34. In the second section, the opening speed of the lid part 110 is reduced.

The section in which the opening of the lid part 110 is from 40° to 60° is referred to as a third section. The second protruding part 356 of the first damper 35 is in contact with the circumferential end part 112a of the first recessed part 112 of the support part 111. The second protruding part 356 is in contact with the end part 112a, and thus the rotating part 352 of the first damper 35 rotates about the shaft 31 with respect to the base part 351 in step with the rotation of the lid part 110 in the opening direction. Like in the second section, the second protruding part 366 of the second damper 36 is in contact with the circumferential end part 113a of the second recessed part 113 of the support part 111. In the second section, the first damper 35 and the second damper 36 operate, and thus resistance of the first damper 35 and resistance of the second damper 36 are gathered to generate resistance stronger than that in the second section. The lid part 110, receiving the resistance of the first damper 35 and the resistance of the second damper 36, rotates along the circumferential direction of the regulators 34. In the third section, the opening speed of the lid part 110 is reduced compared with that in the second section.

Thus, the main body 100 and the lid part 110 of the detection apparatus 1 are coupled with each other with the damper structure 30, whereby the opening speed of the lid part 110 during the opening operation is regulated. The damper structure 30 includes the first damper 35 and the second damper 36 as a plurality of regulators 34. The first damper 35 and the second damper 36 are coupled with each other in the shaft direction with the coupling part 37 placed covering the peripheral face of the first damper 35.

Effect

As described above, the present embodiment couples the main body 100 and the lid part 110 of the detection apparatus 1 with each other with the damper structure 30 and can thereby regulate the opening speed of the lid part 110 during the opening operation.

In the present embodiment, the damper structure 30 includes the first damper 35 and the second damper 36 as a plurality of regulators 34. In the present embodiment, the coupling part 37 placed covering the peripheral face of the first damper 35 can couple the first damper 35 and the second damper 36 with each other in the shaft direction. In the present embodiment, the first damper 35 and the second damper 36 each generate resistance against the biasing force in the opening direction at different timing during the opening motion of the lid part 110. In the present embodiment, the first damper 35 and the second damper 36 are placed so as to simultaneously generate resistance in a partial period during the opening operation of the lid part 110. Thus, the present embodiment combines a plurality of small-sized rotary dampers with each other and can thereby appropriately regulate the opening speed of the lid part 110 during the opening operation.

Thus, the present embodiment can, while appropriately regulating the opening speed of the lid part 110 with respect to the main body 100 of the detection apparatus 1, miniaturize the detection apparatus 1.

In the present embodiment, the circumferential lengths of the first recessed part 112 and the second recessed part 113 of the support part 111 are made different from each other, whereby the time at which resistance against the biasing force in the opening direction starts to be generated and the time at which resistance is simultaneously generated can be regulated to desired times.

In the present embodiment, the time at which resistance against the biasing force in the opening direction starts to be generated and the magnitude of resistance can be achieved by combining a plurality of general-purpose, small-sized rotary dampers with each other.

In the present embodiment, the regulators 34 are placed on the one side of the biasing part 32 in the shaft direction. In the present embodiment, the main body biasing part 33 placed on the other side of the biasing part 32 in the shaft direction positions the shaft 31 with respect to the base part 101. Thus, the present embodiment can reduce wobbling in the damper structure 30.

Modifications

The detection apparatus 1 according to the present disclosure has been described; the present disclosure may be performed in various different modes other than the embodiment described above.

The above describes a case in which the first damper 35 and the second damper 36 are included as exemplary regulators 34; this is not limiting. The regulators 34 may include three or more dampers. When three or more dampers are included, the coupling part 37 is placed covering peripheral faces of dampers other than a damper placed at a position farthest from the wall part 104 in the shaft direction. Thus, the dampers adjacent to each other in the shaft direction are coupled with each other. Thus, the opening speed of the lid part 110 during the opening operation can be regulated more appropriately.

In the above description, the circumferential length L1 of the first recessed part 112 is longer than the circumferential length L2 of the second recessed part 113; this is not limiting. The circumferential length L1 of the first recessed part 112 may be made shorter than the circumferential length L2 of the second recessed part 113. When the circumferential length L1 of the first recessed part 112 is made longer, the section in which the first damper 35 idles becomes longer, and the section in which the first damper 35 rotates about the shaft 31 becomes shorter. When the section in which the first damper 35 rotates becomes shorter, the circumferential length of the notched part 374 may be shorter. On the other hand, when the circumferential length L1 of the first recessed part 112 is made shorter, the section in which the first damper 35 idles becomes shorter, and the section in which the first damper 35 rotates about the shaft 31 becomes longer. When the section in which the first damper 35 rotates becomes longer, the circumferential length of the notched part 374 must be made longer. To reduce the size of the notched part 374 formed in the coupling part 37 to increase the rigidity of the coupling part 37, the section in which the first damper 35 rotates about the shaft 31 is preferably shorter as described in the embodiment.

The present disclosure produces an effect of making it possible to, while appropriately regulating an opening speed of a lid part with respect to a main body of a detection apparatus, miniaturize the detection apparatus.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A detection apparatus comprising:
a main body comprising an installation part in which a cartridge housing a liquid for treating a test substance contained in a specimen is installed and a detector configured to detect the test substance treated with the liquid within the cartridge installed in the installation part;
a lid part arranged rotatably on the main body about a shaft so as to open and close the installation part;
a biasing part biasing the lid part in an opening direction; and
a plurality of regulators each generating resistance against a biasing force in the opening direction at different timing during an opening motion of the lid part, wherein
the regulators comprise a first regulator and a second regulator coupled in a shaft direction of the first regulator,
the detection apparatus further comprises a coupling part placed covering a peripheral face of the first regulator and coupling the first regulator and the second regulator with each other in the shaft direction, the coupling part fixed to the main body, the first regulator has a base part fixed to the main body, a rotating part rotating about the shaft with respect to the base part, and a protruding part protruding radially outward from a peripheral face of the rotating part, the second regulator has a base part fixed to the coupling part, a rotating part rotating about the shaft with respect to the base part, and a protruding part protruding radially outward from a peripheral face of the rotating part, the lid part has a first recessed part with which the protruding part of the first regulator is engaged and a second recessed part with which the protruding part of the second regulator is engaged, the first regulator, during an opening operation of the lid part, does not reduce an opening speed of the lid part in a state in which the protruding part of the first regulator is positioned at a circumferentially intermediate part of the first recessed part and reduces the opening speed of the lid part in a state in which the protruding part of the first regulator is in contact with a circumferential end part of the first recessed part, and the second regulator, during the opening operation of the lid part, does not reduce the opening speed of the lid part in a state in which the protruding part of the second regulator is positioned at a circumferentially intermediate part of the second recessed part and reduces the opening speed of the lid part in a state in which the protruding part of the second regulator is in contact with a circumferential end part of the second recessed part.

2. The detection apparatus according to claim 1, wherein the regulators reduce an opening speed of the lid part at a time at which the resistance starts to be generated.

3. The detection apparatus according to claim 1, wherein the cartridge has a sealant sealing the liquid, and the detection apparatus further comprises a pressing part placed in the lid part and pressing the sealant of the cartridge to open the sealant.

4. The detection apparatus according to claim 1, wherein the biasing part is placed on the shaft, and the regulators are placed on the shaft.

5. The detection apparatus according to claim 4, further comprising a main body biasing part placed on the shaft and biasing the main body in a shaft direction, wherein the regulators are placed on one side of the biasing part in the shaft direction, and the main body biasing part is placed on another side of the biasing part in the shaft direction.

6. The detection apparatus according to claim 1, wherein the regulators are placed so as to simultaneously generate the resistance in a partial period during the opening operation of the lid part.

7. The detection apparatus according to claim 1, wherein a movable range of the protruding part of the first regulator in the first recessed part is wider than a movable range of the protruding part of the second regulator in the second recessed part.

8. The detection apparatus according to claim 1, wherein the first regulator is placed closer to the biasing part than the second regulator is in the shaft direction.

9. The detection apparatus according to claim 1, wherein the regulators include rotary dampers.

10. A damper structure comprising:

a biasing part biasing, in an opening direction, a lid part arranged rotatably on a main body about a shaft in an openable and closable manner; and a plurality of regulators each generating resistance against a biasing force in the opening direction at different timing during an opening motion of the lid part, the regulators comprising a first regulator and a second regulator coupled in a shaft direction of the first regulator, the damper structure further comprising a coupling part placed covering a peripheral face of the first regulator and coupling the first regulator and the second regulator with each other in the shaft direction, the first regulator having a base part fixed to the main body and a rotating part rotating about the shaft with respect to the base part, the second regulator having a base part fixed to the coupling part and a rotating part rotating about the shaft with respect to the base part, the coupling part being fixed to the main body, wherein the first regulator has a protruding part protruding radially outward from a peripheral face of the rotating part, the second regulator has a protruding part protruding radially outward from a peripheral face of the rotating part, the lid part has a first recessed part with which the protruding part of the first regulator is engaged and a second recessed part with which the protruding part of the second regulator is engaged, the first regulator, during an opening operation of the lid part, does not reduce an opening speed of the lid part in a state in which the protruding part of the first regulator is positioned at a circumferentially intermediate part of the first recessed part and reduces the opening speed of the lid part in a state in which the protruding part of the first regulator is in contact with a circumferential end part of the first recessed part, and the second regulator, during the opening operation of the lid part, does not reduce the opening speed of the lid part in a state in which the protruding part of the second regulator is positioned at a circumferentially intermediate part of the second recessed part and reduces the opening speed of the lid part in a state in which the protruding part of the second regulator is in contact with a circumferential end part of the second recessed part.

11. A detection method by a detection apparatus, comprising:

treating a test substance contained in a specimen with a liquid;

detecting the test substance treated with the liquid;

opening a lid part of the detection apparatus;

biasing the lid part in an opening direction;

generating resistance against a biasing force in the opening direction at different timing during an opening motion of the lid part;

coupling a first regulator and a second regulator in a shaft direction of the first regulator;

engaging a protruding part of the first regulator with a first recessed part of the lid part and engaging a protruding part of the second regulator with a second recessed part of the lid part;

during an opening operation of the lid part, not reducing an opening speed of the lid part in a state in which the protruding part of the first regulator is positioned at a circumferentially intermediate part of the first recessed part and reducing the opening speed of the lid part in a state in which the protruding part of the first regulator is in contact with a circumferential end part of the first recessed part; and during the opening operation of the lid part, not reducing the opening speed of the lid part in a state in which the protruding part of the second regulator is positioned at a circumferentially intermediate part of the second recessed part and reducing the opening speed of the lid part in a state in which the protruding part of the second regulator is in contact with a circumferential end part of the second recessed part.

12. The detection method according to claim 11, further comprising: reducing an opening speed of the lid part at a time at which the resistance starts to be generated.

13. The detection method according to claim 11, further comprising:

pressing a sealant of a cartridge to open the sealant.

14. The detection method according to claim 11, further comprising: biasing a main body in a shaft direction.

15. The detection method according to claim 11, further comprising: simultaneously generating the resistance in a partial period during an opening operation of the lid part.

* * * * *